United States Patent [19]

La Gatta

[11] 4,092,249

[45] May 30, 1978

[54] SEWAGE TREATMENT DEVICE

[75] Inventor: Dominick La Gatta, Tempe, Ariz.

[73] Assignee: Commanche Engineering Corp., Rockwell City, Iowa

[21] Appl. No.: 698,266

[22] Filed: Jun. 21, 1976

[51] Int. Cl.² .................. B01D 21/24; C02C 1/08; C02C 1/10

[52] U.S. Cl. .................. 210/195 S; 210/4; 210/197

[58] Field of Search .......... 210/195 S, 220, 14, 210/221 R, 15, 63 R, 218, 532 S, 170, 7, 197, 4

[56] References Cited

U.S. PATENT DOCUMENTS

| | | | |
|---|---|---|---|
| 3,202,285 | 8/1965 | Williams | 210/14 X |
| 3,206,032 | 9/1965 | Nottingham et al. | 210/195 S |
| 3,251,471 | 5/1966 | Allen | 210/220 X |
| 3,642,615 | 2/1972 | Wieferig | 210/195 S X |
| 3,677,409 | 7/1972 | Ferm et al. | 210/195 S |
| 3,709,363 | 10/1970 | Smart et al. | 210/195 S |
| 3,757,950 | 9/1973 | Zebley | 210/195 S X |
| 3,883,427 | 5/1975 | Oldham et al. | 210/195 S X |
| 3,907,672 | 9/1975 | Milne | 210/195 S X |
| 3,951,817 | 4/1976 | Snyder | 210/220 X |
| 3,997,437 | 12/1976 | Prince et al. | 210/14 X |
| 4,002,561 | 1/1977 | Traverse | 210/220 X |

FOREIGN PATENT DOCUMENTS 1,499,649 9/1967 France .................. 210/14

Primary Examiner—Morris O. Wolk
Assistant Examiner—Arnold Turk
Attorney, Agent, or Firm—Zarley, McKee, Thomte, Voorhees & Sease

[57] ABSTRACT

Sewage treatment device comprises an enclosed housing having exterior walls and first and second interior walls forming first, second and third compartments within the housing. A first opening is provided in the first interior wall forming communication between the first and second compartments, and a second opening is provided in the second interior wall for providing communication between the second and third compartments. The openings are placed at a predetermined height so that the fluid will rise to the predetermined height and then overflow into the next adjacent compartment. A recirculating pump is located in the third compartment and recirculates fluid back into the second compartment where it is sprayed into the second compartment by means of spray heads, one of which is located above the fluid level and one of which is located below the fluid level. Vent means are provided in the housing for providing communication between the second compartment and the atmosphere so that oxygen is exposed to the fluid in the second compartment. A field pump within the third compartment pumps the fluid therein out of the third compartment to the exterior of the housing whenever fluid rises above the predetermined height within the third compartment.

6 Claims, 7 Drawing Figures

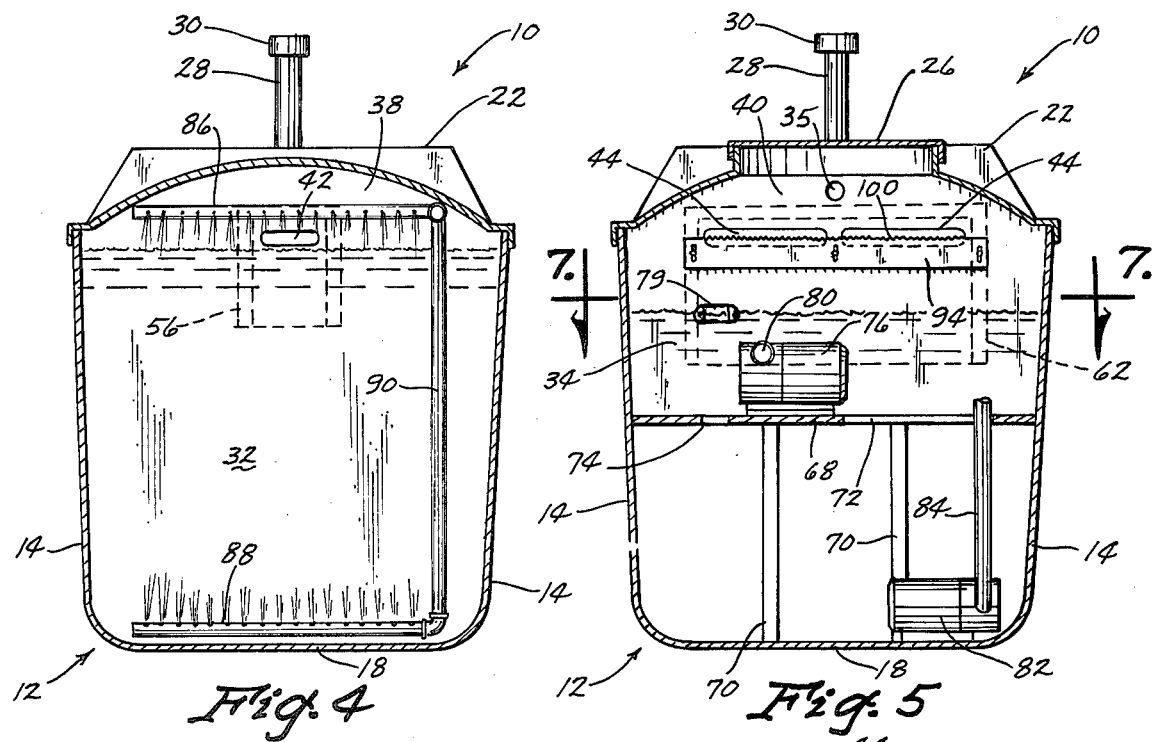
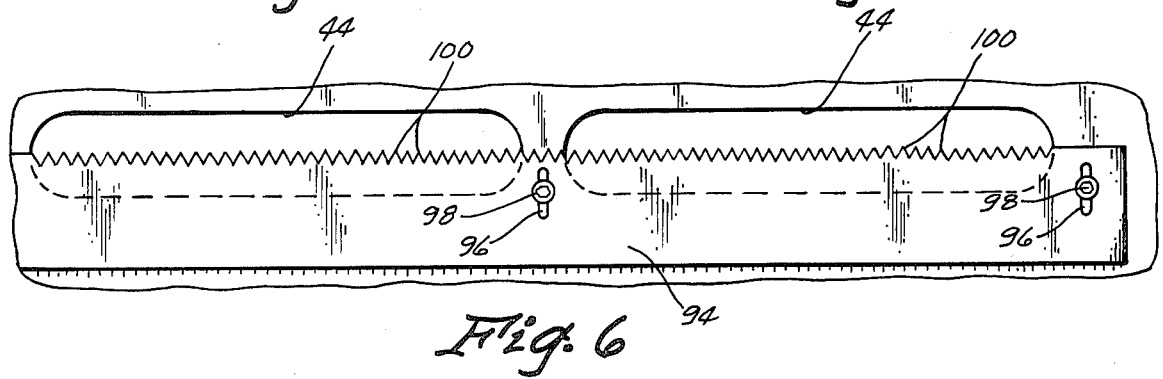
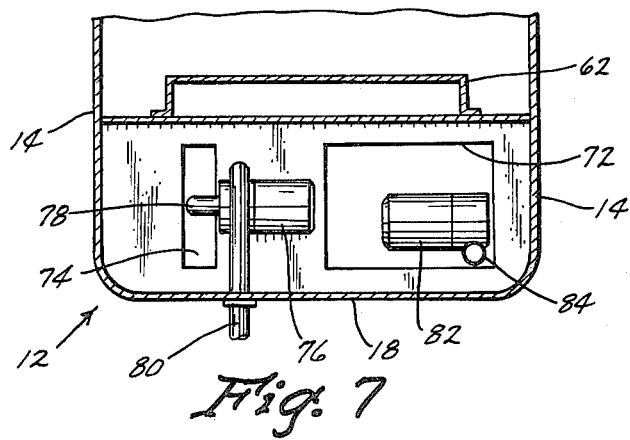

4,092,249

SEWAGE TREATMENT DEVICE

SUMMARY OF THE INVENTION

This invention relates to septic tanks and specifically to the septic tank capable of aerobic breakdown of the sewage.

Septic tanks conventionally are completely enclosed so as to prevent the sewage from being exposed to oxygen. In these anaerobic septic tanks, the sewage is broken down completely by anaerobic bacteria.

An improved breakdown of the sewage has been obtained by the use of aerobic septic tanks. Heretofore these aerobic septic tanks have utilized an air compressor to pump air into the tank and to bubble the air through the sewage so as to permit aerobic breakdown to take plae.

The present invention relates to a septic tank which permits aerobic breakdown of the sewage, but which does not utilize an air compressor. Instead, the present invention utilizes a three compartment tank which permits the sewage to move progressively from a first, to a second, to a third compartment, and which further provides for recirculation of the fluid back from the third compartment into the second compartment. When recirculated, the fluid is sprayed into the second compartment which has a vented air chamber above the fluid level. By spraying the fluid into this second compartment, the present invention permits the exposure of the fluid to oxygen and further causes agitation of the fluid within the second compartment.

The sprays are directed in such a manner so as to create a circular agitation motion within the second compartment, thereby maintaining many of the solid materials in suspension within the fluid. This permits a more thorough and complete breakdown of the fluids, and it has been found that the fluid in the third compartment exhibits an improved purity over that obtained with prior aerobic or anaerobic septic tanks.

Therefore, a primary object of the present invention is the provision of an improved aerobic septic tank.

A further object of the present invention is the provision of an aerobic septic tank which does not require an air compressor in order to expose the fluid to oxygen.

A further object of the present invention is the provision of a septic tank which exposes the fluid to oxygen by means of spraying the fluid into a compartment which is vented to the atmosphere.

A further object of the present invention is the provision of a septic tank which includes a combination of baffles and scoops to maintain the floating solids within the first and second compartments, and to minimize the chances that the solid materials will reach the third and final compartment.

A further object of the present invention is the provision of means including an adjustable weir for maintaining the level of the fluid at a predetermined height within each of the three chambers.

A further object of the present invention is the provision of a septic tank wherein the fluid is constantly under agitation so as to maintain the solid particles in suspension and thereby facilitate more complete and thorough breakdown than in previous prior art devices.

A further object of the present invention is the provision of a device which is economical to manufacture durable in use and reliable in operation.

DETAILED DESCRIPTION OF THE FIGURES

Figure 3:
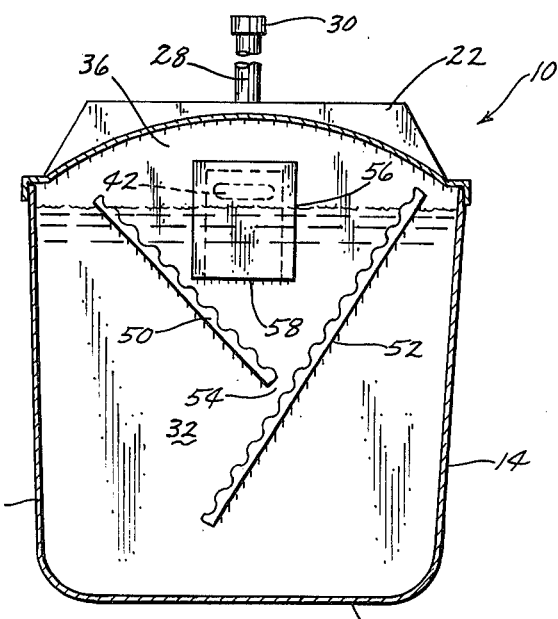
Figure 2:
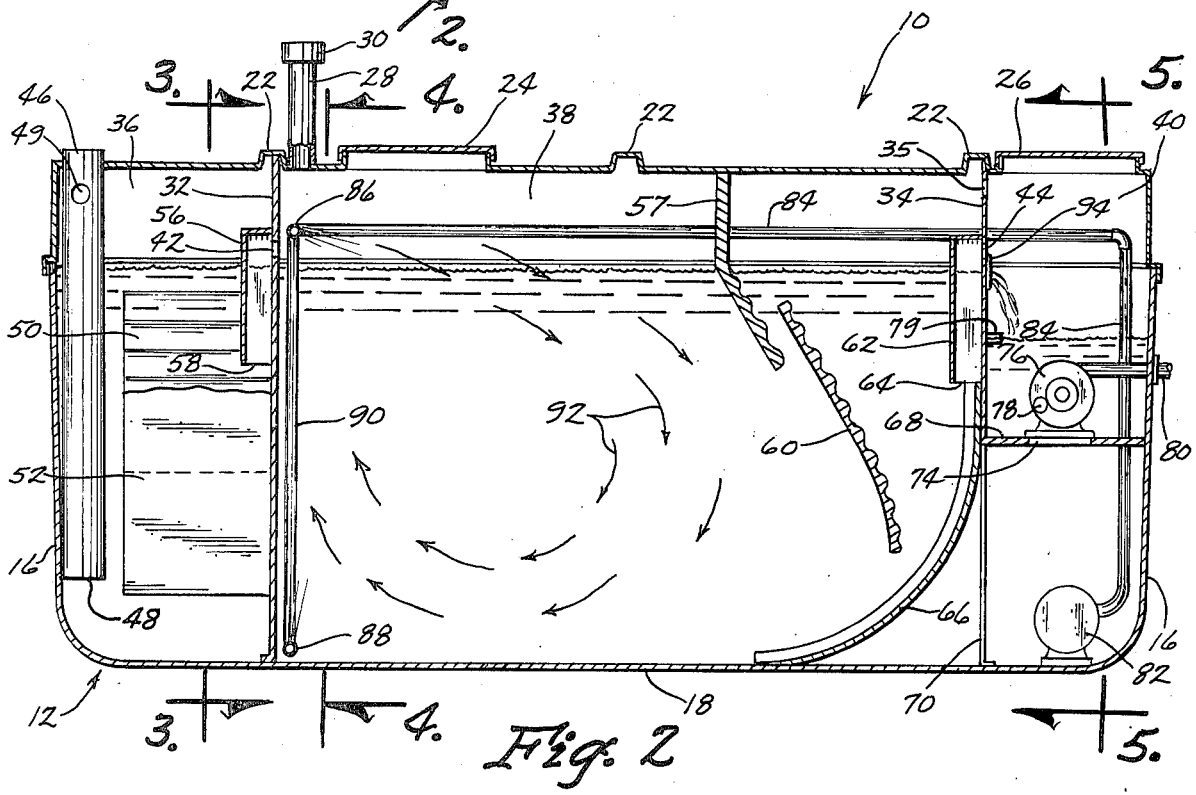
FIG. 2 is a sectional view taken along line 2—2 of FIG. 1, but showing the tank in an assembled condition.

FIGS. 3, 4 and 5 are sectional views taken along lines 3—3, 4—4, and 5—5 of FIG. 2.

FIG. 6 is a partial detailed view of the weir which appears on the partition between the middle and final compartment of the tank.

FIG. 7 is a sectional view taken along line 7—7 of FIG. 5.

DETAILED DESCRIPTION OF THE DRAWINGS

Referring to the drawing, the numeral 10 generally designates the septic tank of the present invention. Tank 10 comprises a base 12 having side walls 14, end walls 16 and bottom wall 18. A lid 20 is adapted to fit over base 12 and be permanently secured thereto. Lid 20 includes three reinforcing ribs 22 and a pair of manholes 24, 26. A vent pipe 28 extends through the upper surface of lid 20 to provide communication between the interior of the septic tank 10 and the atmosphere. Vent pipe 28 includes a conventional vent head 30 for protruding above the ground and for permitting air to enter tank 10 while at the same time protecting against the introduction of foreign objects into the tank through vent pipe 28.

A first partition 32 is fitted within tank 10 with its upper end seated within the under edge of reinforcing rib 22, and a second partition 34 similarly fitted within tank 10 at the opposite end thereof with its upper surface also seated within the under surface of a reinforcing rib 22. Partitions 32, 34 are sealed against the interior walls of base 12 so as to divide tank 10 into three separate compartments, referred to for purposes of identification as a primary treatment compartment 36, a secondary treatment compartment 38, and a final treatment compartment 40. Partition 32 includes horizontally elongated spill-over opening 42 and partition 34 includes two horizontally disposed spill-over openings 44. Spill-over openings 42, 44 are located at a predetermined height which is spaced slightly downwardly from lid 20. It is intended that the fluid level within compartments 36, 38 will be maintained approximately at the lower margins of openings 42, 44 so that an air chamber is provided above the surface of the fluid in each of these two compartments. This air chamber is constantly provided with oxygen by means of vent pipe 28, and communication of air between the three chambers is achieved by virtue of the fact that the fluid is constantly maintained at a level below the upper margin of openings 42, 44 by means described hereinafter. An air hole 35 also facilitates air communication between compartments 38, 40. The fluid level in final treatment compartment 40 is maintained at a slightly lower level by means of a pump to be described hereinafter.

An inlet conduit 46 extends from outside primary compartment 36 to the interior thereof and extends downwardly where it terminates in a lower end 48 spaced slightly above the bottom 18 of tank 10. Conduit 46 is adapted to be connected to the soil pipe from the source of sewage to be treated. A hole 49 is provided in conduit 46 at a point above the fluid level to permit the venting of sewer gas to the vent stack of the sewage source.

Referring to FIG. 3, primary compartment 36 is provided with a pair of baffle members 50, 52 which extend in a plane perpendicular to first partition 32 and which appear in cross-section to have a y-shaped configuration. The juncture between baffle members 50, 52 is not closed so that a small space 54 is provided therebetween.

Operatively secured to partition 32 is a scoop 56 which is closed on all sides and on its upper end, and is open only at its lower end 58. Scoop 56 is in covering relation over opening 42, and is positioned so that lower end opening 58 of scoop 56 is spaced substantially below the lower margin of opening 42 as readily seen in FIGS. 2 and 3. This places the opening 58 of scoop 56 substantially below the fluid surface within primary compartment 36, and prevents any floating solid particles on the surface of the fluid from entering opening 42. Similarly, baffles 50, 52 prevent particles which exit from lower end 48 of inlet conduit 46 from floating upwardly into opening 58 of scoop 56. Thus, scoop 56 and baffles 52, 54 substantially hinder the entry of floating particles into opening 42.

Within secondary treatment compartment 38 are a pair of baffle members 57, 60. These baffle members are positioned adjacent but spaced from spill-over opening 44 in partition 34, and prevent the entry of fluid into opening 34 except in the path around the lower end of baffle 57 or the lower end of baffle 60.

A second scoop 62 similar to scoop 56 is mounted to partition 34 in covering relation over opening 44, and includes a lower open end 64 through which fluid may gain entry to opening 44. As with scoop 56, the lower end 64 of scoop 62 is positioned substantially below the opening 44 and below the fluid level within tank 10 so that floating particles on the surface of the fluid within tank 10 are prohibited from entering into opening 44. Baffles 57, 60 also contribute to preventing floating solid particles from gaining entry to the lower end of scoop 62. Thus, the fluid within secondary compartment 38 which is located upwardly above and to the right of baffles 57, 60 is substantially free from solid floating particles, and this is particularly true of the fluid which is adjacent the lower end 64 of scoop 62.

Figure 1:
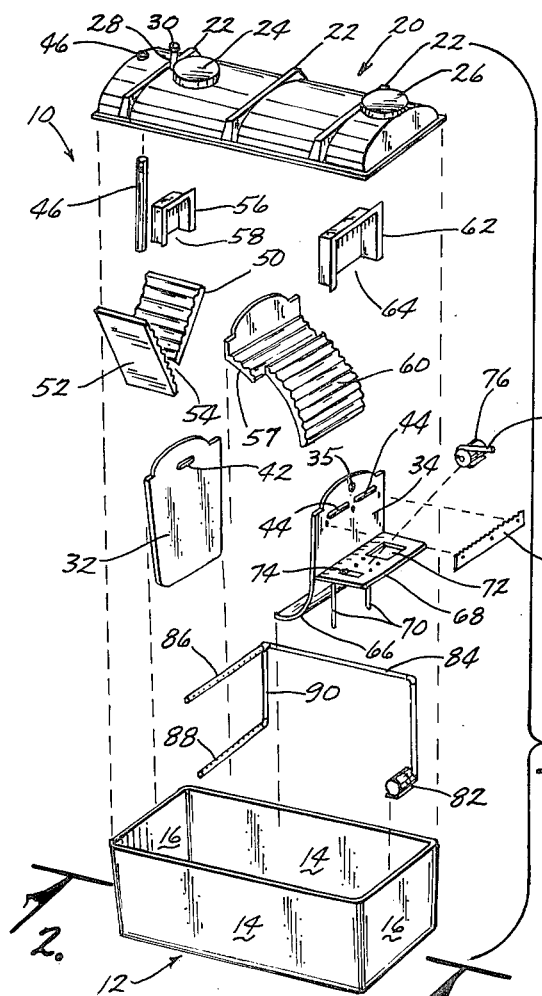
FIG. 1 is an exploded perspective view of the present invention.

Second partition 34 at its lower end includes a curved portion 66 which gives a curved lower right hand corner to secondary compartment 38 as viewed in FIG. 2. Within final compartment 40 is a horizontal support platform 68 which is supported in spaced relation above bottom wall 18 by means of support legs 70. Platform 68 includes a large opening 72 (FIG. 1) and a slightly smaller opening 74 for permitting fluid to communicate between the space above platform 68 and the space below platform 68. Supported on platform 68 is a sump pump 76 having an inlet opening 78. Pump 76 also includes an outlet conduit 80 which is adapted to lead to a lateral field system. A micro switch 79 is adapted to actuate pump 76 whenever the fluid level within tank 10 rises above a predetermined height, and this predetermined height is determined to be approximately 5–6 inches above the top of pump 76. Thus, as fluid flows inwardly through inlet conduit 46 into primary tank 36, it causes a rise in the level of fluid in all three tanks, 36, 38, 40 and initiates actuation of pump 76 to direct fluid from final tank 40 outwardly through outlet conduit 80 to the lateral field.

Mounted adjacent the bottom of final compartment 40 is a recirculating pump 82. Pump 82 is adapted to recirculate fluid from the bottom of final compartment 40 upwardly through a conduit 84 which extends into secondary compartment 38 and which terminates adjacent first partition 32. Connected to conduit 84 adjacent first partition 32 are a pair of spray heads 86, 88 which are interconnected by a pipe 90. (FIGS. 2 and 4). Spray head 86 includes a plurality of apertures along the length thereof which are directed downwardly and toward second partition 34 at approximately a 45° angle. Spray head 86 is also positioned in spaced relation above the fluid level within secondary compartment 38 so that the fluid exiting from the apertures therein is exposed to oxygen in the air space above the fluid within secondary compartment 38. Furthermore, when this fluid spray splashes into the fluid already within secondary compartment 38, it causes mixing of the air above the fluid level with the fluid within secondary compartment 38 and further aerates the fluid therein. Furthermore, the inclined attitude of the spray exiting from spray head 86 imparts a circular agitation to the fluid within compartment 38 as is illustrated by arrows 92.

Spray head 88 is located adjacent the bottom of secondary compartment 38 and is directed upwardly so as to further contribute to the circular agitation illustrated by arrows 92. The direction of spray head 88 may be straight up or may be directed slightly toward first partition 32, and by being so directed contributes substantially to the circular agitation of the fluid. Another factor which contributes to the circular motion of the fluid is the inclined attitude of baffles 57, 60, and the arcuate shape of curved portion 66 of secondary partition 34. Agitation and aeration of the fluid within secondary compartment 38 contributes substantially to the breakdown of the sewage particles therein and also towards maintaining these particles in suspension so that they may be broken down more quickly and thoroughly.

Referring to FIGS. 2, 5 and 6, an adjustable weir 94 is mounted to second partition 34, and extends across openings 44. Weir 94 includes vertical slots 96 which receive bolts 98 for permitting vertical selective adjustment of the position of weir 94. The upper edge of weir 94 is provided with serrations 100, which screen against floating particles on the surface of the fluid as it passes through openings 44. The purpose of weir 94 is to control the level of fluid passing between compartment 38 and compartment 40 through opening 44. After the septic tank has been installed in the ground, the operator can adjust weir 94 so that it is level and so that it is at the proper height to maintain the fluid at the desired level between the upper and lower margins of opening 44.

In operation the raw sewage enters primary compartment 36 through the lower end 48 of inlet conduit 46. The entry of the fluid causes agitation of the fluid already within primary compartment 36, and oxygen within the upper end of compartment 36 is exposed to the fluid and mixes slightly therewith so as to contribute to the breakdown of the particles therein. Some particles will settle to the bottom of compartment 36, other particles will float on the upper surface of the fluid therein, and still other particles will remain in suspension throughout the fluid.

As fluid enters primary compartment 36, it causes a rise of the fluid already therein, which in turn causes an overflow of fluid through opening 42 into secondary compartment 38. As previously explained, baffles 50, 52 and scoop 56 retard the movement of floating particles within compartment 36 so that they are hindered from entering through opening 42 into secondary compartment 38.

Within secondary compartment 38, the fluid is exposed to agitation and aeration by means of spray heads 86, 88. In presently known aerobic septic tanks, the aerobic breakdown is obtained by forcing air into the fluid by means of a compressor. The present invention differs from these prior devices by instead recirculating fluid from final compartment 40 into secondary compartment 38 through spray head 86, 88. As previously explained, spray heads 86, 88 impart both an aeration and an agitation to the fluid within secondary compartment 38. Baffles 57, 60 prevent large particles from gravitating to or floating upwardly adjacent opening 44 in partition 34. Thus, the larger particles within secondary compartment 38 appear to the left as viewed in FIG. 2 and are constantly agitated until the aerobic bacteria break them down into extremely fine particles. As the clear fluid collects adjacent the right hand end of secondary compartment 38, it is permitted to enter through lower end 64 of scoop 62 and to spill into final compartment 40. This is a continuous movement by virtue of the fact that fluid is constantly being circulated by means of recirculating pump 82 from final compartment 40 into secondary compartment 38. Whenever the fluid level within compartment 40 rises above a predetermined level, pump 76 is actuated to pump the excess fluid outwardly to the lateral field system.

The present invention combines the use of three separate compartments, together with constant agitation and aeration of the fluid to provide an improved sewage treatment septic tank over that previously obtained with prior art devices. The fluid within final compartment 40 is substantially improved in cleanliness and purity over the cleanliness and purity obtained with prior devices. Furthermore, build-up within septic tank 10 is not a serious problem inasmuch as the fluid is constantly being agitated and broken down and then flushed outwardly to the lateral field. Thus, it can be seen that the device accomplishes at least all of its stated objectives.

What is claimed is:

1. A sewage treatment device comprising:
    an enclosed housing having opposite end walls, opposite side walls, a top wall and a bottom wall;
    first and second upstanding partition walls each engaging said bottom wall and opposite side walls of said housing so as to divide said housing into first, second, and third serially connected compartments;
    said first partition wall having a first opening located at a first predetermined height above said bottom wall and forming communication between said first and second compartments;
    said second partition wall having a second opening located at a second predetermined height above said bottom wall and forming communication between said second and third compartments;
    an inlet conduit forming communication from the exterior of said housing to the interior of said first compartment;
    vent means in said top wall of said housing forming communication between said second compartment and the atmosphere whereby gases produced by sewage decomposition may escape and oxygen may enter said second compartment;
    a recirculating pump having an inlet adjacent the bottom of said third compartment;
    a recirculating conduit connected to said recirculating pump and extending into said second compartment adjacent said first partition wall;
    upper and lower spray heads connected to said recirculating conduit adjacent said first partition wall, said upper spray head being positioned above said second predetermined height so as to spray effluent into the vented space within said second compartment above the fluid level therein, said lower spray head being positioned adjacent said bottom wall of said second compartment and adjacent said first partition whereby effluent exiting from said upper and lower spray heads will impart a circular agitation to said fluid in said second compartment and
    a field pump within said third compartment for pumping fluid out of said third compartment to the exterior of said housing whenever fluid rises above a third predetermined level within said third compartment.

2. A sewage treatment device according to claim 1 comprising first and second baffle walls within said first compartment extending from said first interior wall of said housing in planes perpendicular thereto; said first and second walls forming in cross-section the legs of a y-shaped configuration with said legs being spaced apart at the juncture therof, said scoop and opening being positioned between said baffle walls above said y-shaped juncture thereof.

3. A sewage treatment device according to claim 1 wherein said upper spray head is positioned to spray in a downwardly inclined direction and said lower spray head is positioned to spray in an upward direction.

4. A sewage treatment device according to claim 1 comprising baffle means within said second compartment positioned in spaced relationship to and between said spray heads and said second opening; said baffle means having opposite side edges in engagement with said opposite side walls of said housing, said baffle means extending downwardly from above said second predetermined height and terminating in a lower edge spaced from and adjacent said bottom wall of said housing whereby effluent must pass below said lower edge of said baffle means in order to move from said spray heads to said second opening.

5. A sewage treatment device according to claim 4 wherein said upper spray head is positioned to spray in a downwardly inclined direction and said lower spray head is positioned to spray in an upward direction, said baffle means having an approximately arcuate surface oriented approximately tangential to the circular movement of said fluid within said second compartment.

6. A sewage treatment device according to claim 5 wherein said second partition comprises an arcuate portion adjacent the lower end thereof to provide a concave curved surface at the juncture between said second partition and said bottom wall within said second compartment.

* * * * *